United States Patent [19]

Riley

[11] Patent Number: 4,796,180
[45] Date of Patent: Jan. 3, 1989

[54] METHOD OF MONITORING MAIL DELIVERY
[75] Inventor: Prince I. Riley, Chicago, Ill.
[73] Assignee: R. R. Donnelley & Sons Co., Chicago, Ill.
[21] Appl. No.: 918,084
[22] Filed: Oct. 14, 1986
[51] Int. Cl.$^4$ .............................................. G06F 15/20
[52] U.S. Cl. .................................. 364/400; 364/402; 364/552; 364/554
[58] Field of Search ................ 364/400, 401, 552, 554

[56] References Cited

U.S. PATENT DOCUMENTS 3,091,756  5/1963  Lowman ........................ 364/554 X
4,674,052  6/1987  Wong et al. ........................ 364/466

Primary Examiner—Parshotam S. Lall
Assistant Examiner—Edward R. Cosimano
Attorney, Agent, or Firm—Wood, Dalton, Phillips, Mason & Rowe

[57] ABSTRACT

A method of monitoring the delivery of mail pieces by the postal service utilizes a data processor. A batch mailing includes selected mailing pieces to be monitored with each selected mailing piece being identified with a multi-digit number uniquely identifying a respondent therefor and the mailing piece. When the mailing piece is received the respondent telephonically reports the identifying number, date of receipt and condition of the mailing piece to the data processor. This information is stored by the data processor and is used to generate daily and batch reports showing, for example, date of receipt according to geographic location and/or pre-sort level of the mail pieces.

30 Claims, 8 Drawing Sheets

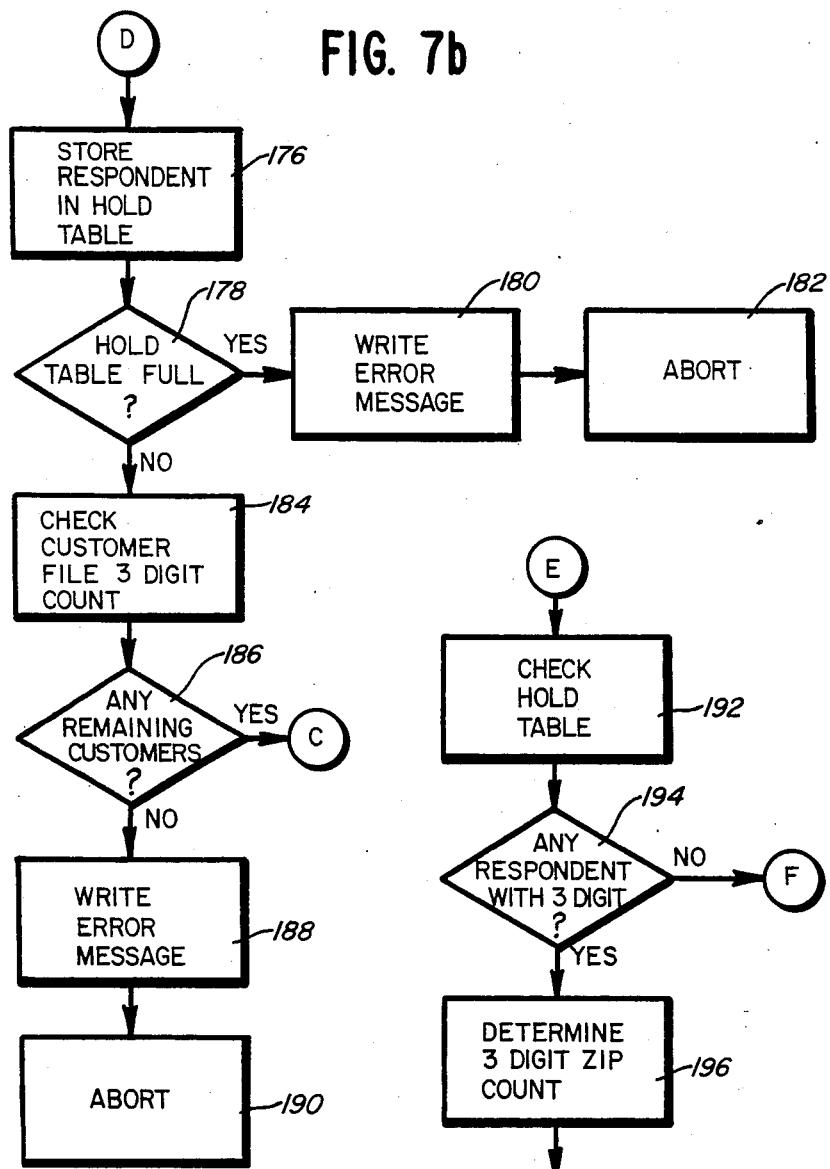
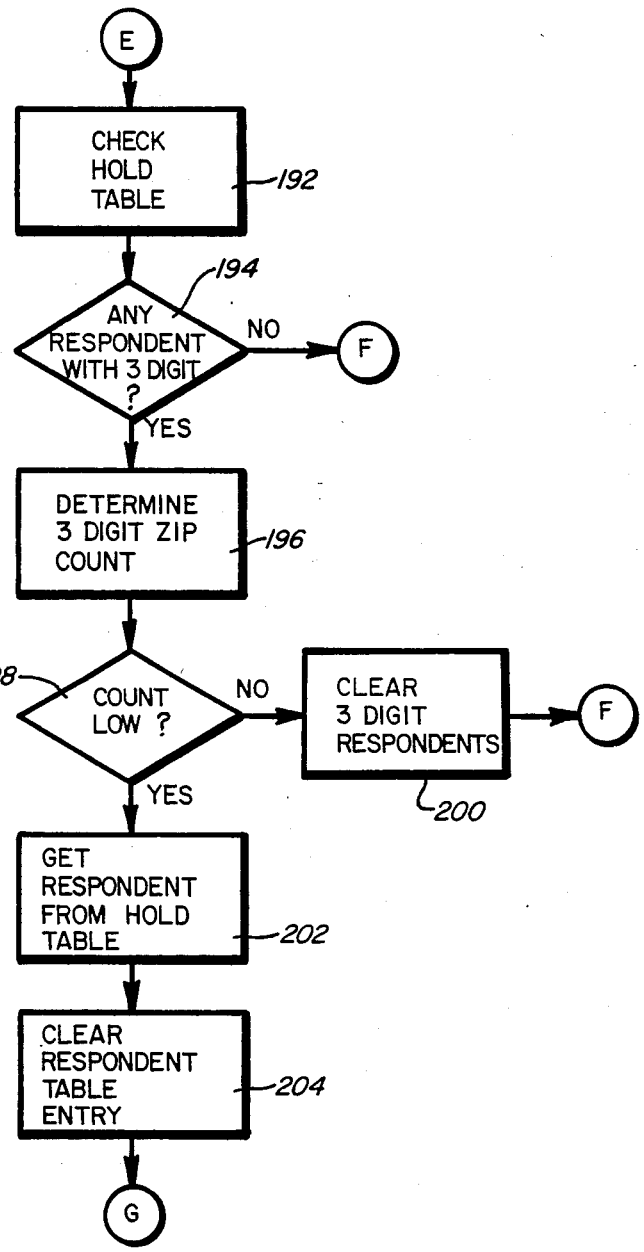
FIG. 7b
FIG. 7c

METHOD OF MONITORING MAIL DELIVERY

FIELD OF THE INVENTION

This invention relates to a method of monitoring the delivery status of selected pieces in a batch delivery through a delivery service.

BACKGROUND OF THE INVENTION

In a direct delivery campaign, such as the mailing of a seasonal catalog to customers, timely delivery of mail is important. Thus, there is a need to monitor mail delivery to aid in planning such a campaign, and to identify and correct problem areas in an ongoing campaign.

One known method of monitoring the delivery status of mail is used by the postal service to monitor delivery between different post offices. This method provides no information concerning delivery to the ultimate destination.

Other known monitoring methods utilize return forms or postcards which are included with a piece of mail. A respondent upon receiving the mail piece fills in requested information on the form or postcard and mails it back to the originator of the mailing. However, because of reliance on a return mailing, such a monitoring method provides responses which are not received quickly enough to take corrective action in the event that problems exist. Also, the delivery status information must be manually correlated once it is received. With a large mailing this can be burdensome.

The present invention is intended to overcome these and other problems with delivery monitoring methods.

SUMMARY OF THE INVENTION

It is an object of this invention to provide a method for monitoring the delivery status of selected pieces which improves the reporting response time so that problems can be identified quickly and accurately.

In accordance with this invention selected pieces directed to respondents are included in a batch delivery which are forwarded by a delivery service. Each piece is encoded with indicia uniquely identifying the respondent therefor. After the pieces are forwarded to the respondents the date of receipt is telephonically reported to a data processor by the respondent. The date of receipt is recorded and a report is generated. The indicia may comprise a seven digit number which uniquely identifies the respondent by name and address, and a three digit number which uniquely identifies the piece. The data processor replies to the respondent using voice synthesizing means instructing the respondent to provide receipt information. The receipt information may be a four digit number representing the date on which the respondent receives the mailing piece, and an additional digit representing the condition of the received piece. The receipt information is recorded, for example, on a magnetic disk memory to be later used for generating daily and final reports.

The invention may be used, for example, to monitor delivery status of selected mailing pieces which are delivered by the postal service.

Another feature of this invention is that one of the seven respondent identification digits is a check digit. The check digit is used to verify that the reported seven digit number is correct.

A further feature of this invention is the use of a push button operated, multiple frequency coded telephone by the respondent to report information to the data processor.

Yet another feature is the generation of an advance notification postcard which is mailed to the respondents in advance of a mailing to advise the anticipated delivery of an encoded mailing piece.

Still another feature of this invention is the insertion of a list of respondents onto a customer list for the batch mailing so that postal discount levels and handling characteristics are not altered.

A further feature of this invention is the selection of respondents according to a geographic distribution of the batch mailing.

Further features and advantages of this invention will be readily apparent from the specification and from the drawings.

BRIEF DESCRIPTION OF THE DRAWINGS

FIGS. 7a–7c are a flow diagram of the insertion method for including the mailing pieces in a batch mailing.

DESCRIPTION OF THE INVENTION

Figure 1:
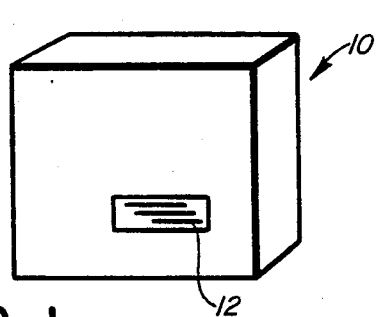
FIG. 1 illustrates a typical mailing piece showing an encoded mailing label affixed thereon.

Referring first to FIG. 1, a mailing piece 10 is illustrated with a mailing label 12 affixed thereon. The mailing piece 10 is to be forwarded to a respondent through the postal service in a batch mailing. Such a batch mailing may be to send a seasonal catalog to customers. Included in the batch mailing are additional catalogs to be mailed to respondents to monitor date of receipt of the catalogs and condition of the catalogs when received.

Alternatively, comparable delivery services can be monitored. The term "mail" used herein includes other such forms of delivery.

Figure 2:
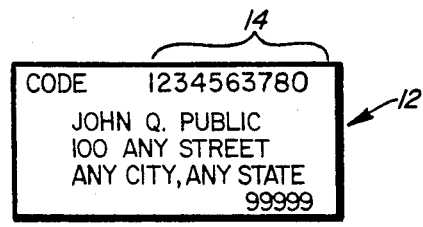
FIG. 2 illustrates in greater detail the mailing label encoded with indicia identifying the respondent and the mailing piece.

The mailing label 12 is illustrated in greater detail in FIG. 2. The label 12 has indicia including the respondents' name, address and a multi-digit number 14 which uniquely identifies the respondent and the mailing piece.

The delivery respondents are preselected and trained as to what action to take when an encoded mailing piece 10 is received. The respondents are selected so that their representation corresponds with the U.S. Postal Service delivery statistics file. Thus, the database of respondents represents all postal respondents, on a smaller scale.

When a respondent is recruited he or she is issued an instruction card (not shown). The instruction card advises the respondent what steps to take when an encoded mailing piece is received. Also described thereon are procedures to follow in special situations, such as when a respondent will be away from home.

Each respondent is assigned a seven digit number which uniquely identifies the respondent and the respondent's address. The first two digits thereof identify a group of respondents which the respondent is assigned to. A particular mail order house may have its own list of respondents who are only utilized for monitoring mailing of their own catalogs. Such a mail order house will be assigned its own two digit group number. The next four digits are randomly assigned to respondents in a group. The last of the seven digits is a check digit which is used to verify the correctness of the seven digit number when it is reported by a respondent. The check digit is determined by multiplying each of the six digits by $2^x$ where x represents the position of the digit from right to left, starting with the one position; summing the products; dividing the total by nine; and subtracting the remainder from nine. For example, the respondent code 123456 has a check digit of 3 which is calculated as follows:

$$((1\times2^6)+(2\times2^5)+(3\times2^4)+(4\times2^3)+(5\times2^2)+(6\times2^1))/9=26R6; 9-6=3$$

This formula is based on number theory and permits the check digit to be used to minimize errors which could be caused by transposition of any of the six digits.

A unique three digit number is randomly assigned to the particular catalog, or other mailing piece, which is being monitored. The multi-digit number 14 comprises the seven digit and the three digit numbers.

Figure 3:
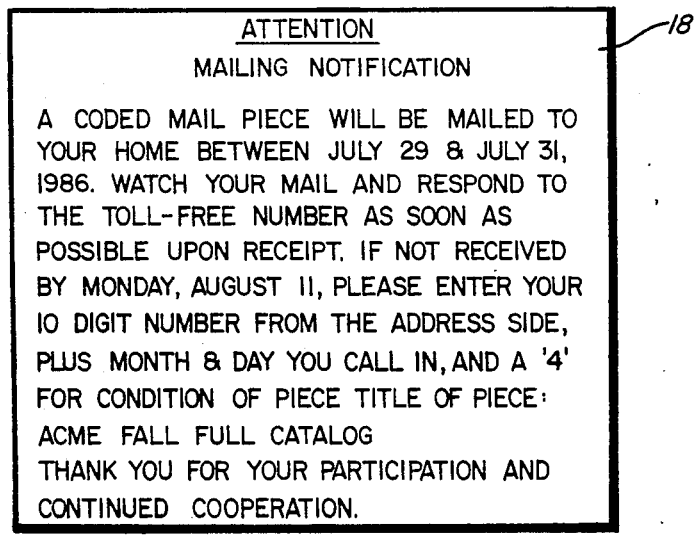
FIG. 3 illustrates an advance notification postcard.

It is desirable to advise each respondent in advance to expect a mailing piece which is to be reported. Otherwise, the respondent may not notice the multi-digit number 14 and fail to report receipt of the mail piece. For this reason each respondent receives an advance notification postcard 18, see FIG. 3, prior to receiving the mailing piece notifying the anticipated delivery thereof. The postcard 18 also advises the respondent as to what action should be taken if the mailing piece is not received by a given date.

Figure 4:
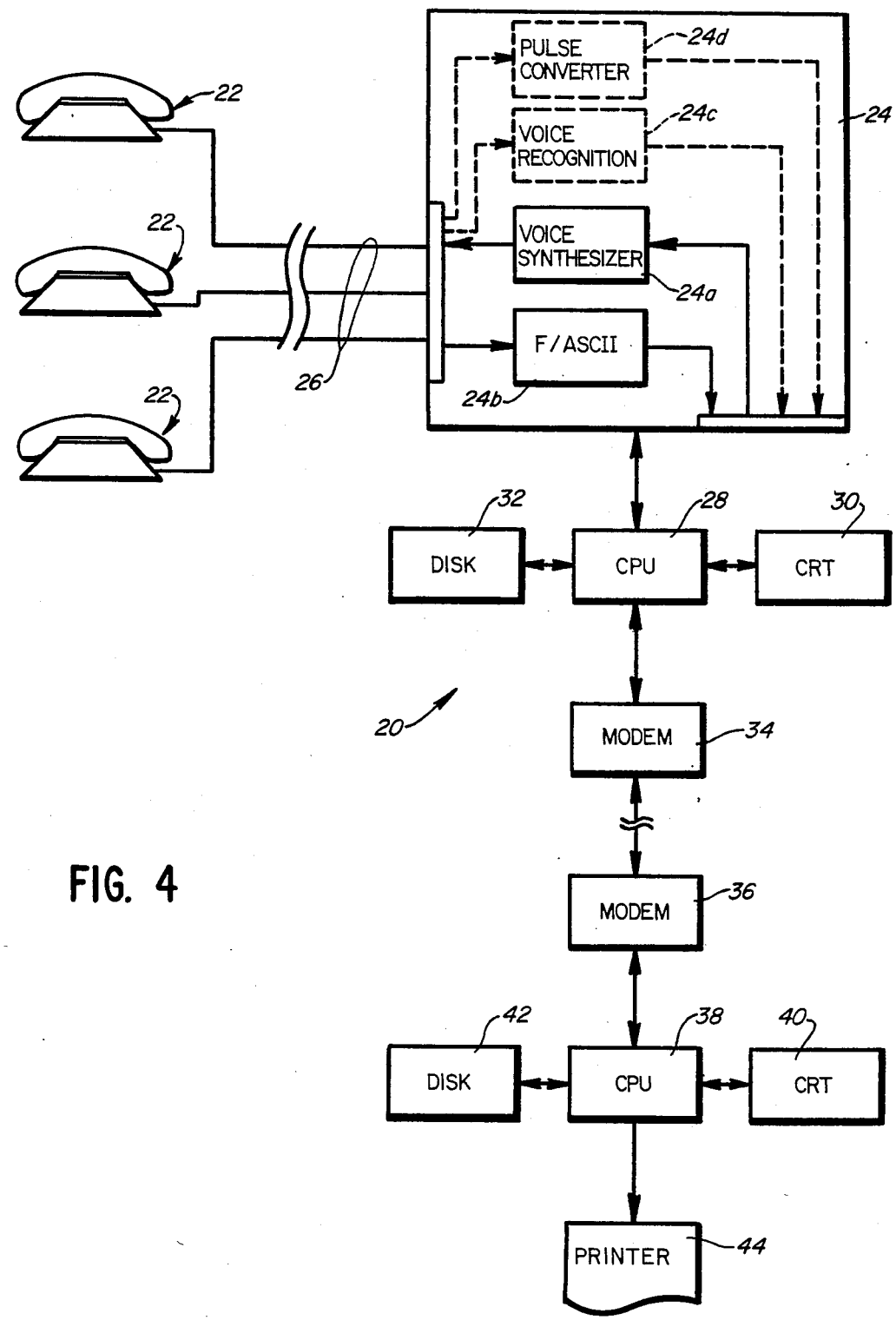
FIG. 4 is a block diagram illustrating the invention.

With reference to FIG. 4, a data processing system 20 records and reports information provided by respondents. Each respondent utilizes a telephone 22 to report receipt information. A telephone interface 24 is coupled to telephone lines 26 which enable the respondents to communicate with the telephone interface 24. The telephone interface 24 monitors incoming telephone calls and includes a voice synthesizing circuit or converter 24a for prompting the calling respondent to enter date of receipt information into the data processor 20. If the respondent utilizes a push button operated, multiple frequency coded telephone, the receipt information is entered using the telephone's push buttons. The telephone interface 24 includes a circuit 24b for converting the multiple frequency codes into ASCII coded characters required by the data processor 20. Alternatively, a speaker independent voice recognition circuit or converter 24c can be utilized so that the respondent can enter the receipt information by reciting it into the telephone's mouth piece, or a pulse decoder 24d is used if respondents report using rotary dial telephones.

The telephone interface is coupled to a first central processing unit (CPU) 28. Peripheral devices such as a CRT display 30 and a magnetic disk memory 32 are also coupled to the first CPU 28. The disk memory 32 stores the receipt information reported by the respondents.

The first CPU 28 is a personal computer which can perform only a single task at one time. An additional CPU is required in order to record receipt information from respondents and print reports simultaneously. Therefore, a pair of modems 34, 36 couple the first CPU 28 to a second CPU 38. The second CPU 38, also a personal computer, is coupled to a CRT display 40, a magnetic disk memory 42 and a printer 44. The modems 34, 36 transmit receipt information from the first CPU to the second CPU. The printer 44 generates daily reports and batch reports. Alternatively, the user could move magnetic disks between the two CPU's 28, 38, eliminating the modems 34, 36. If a multi-task capability CPU is used, the second CPU 38 is unnecessary. The printer 44 is then coupled to the first CPU 28.

Figure 5A:
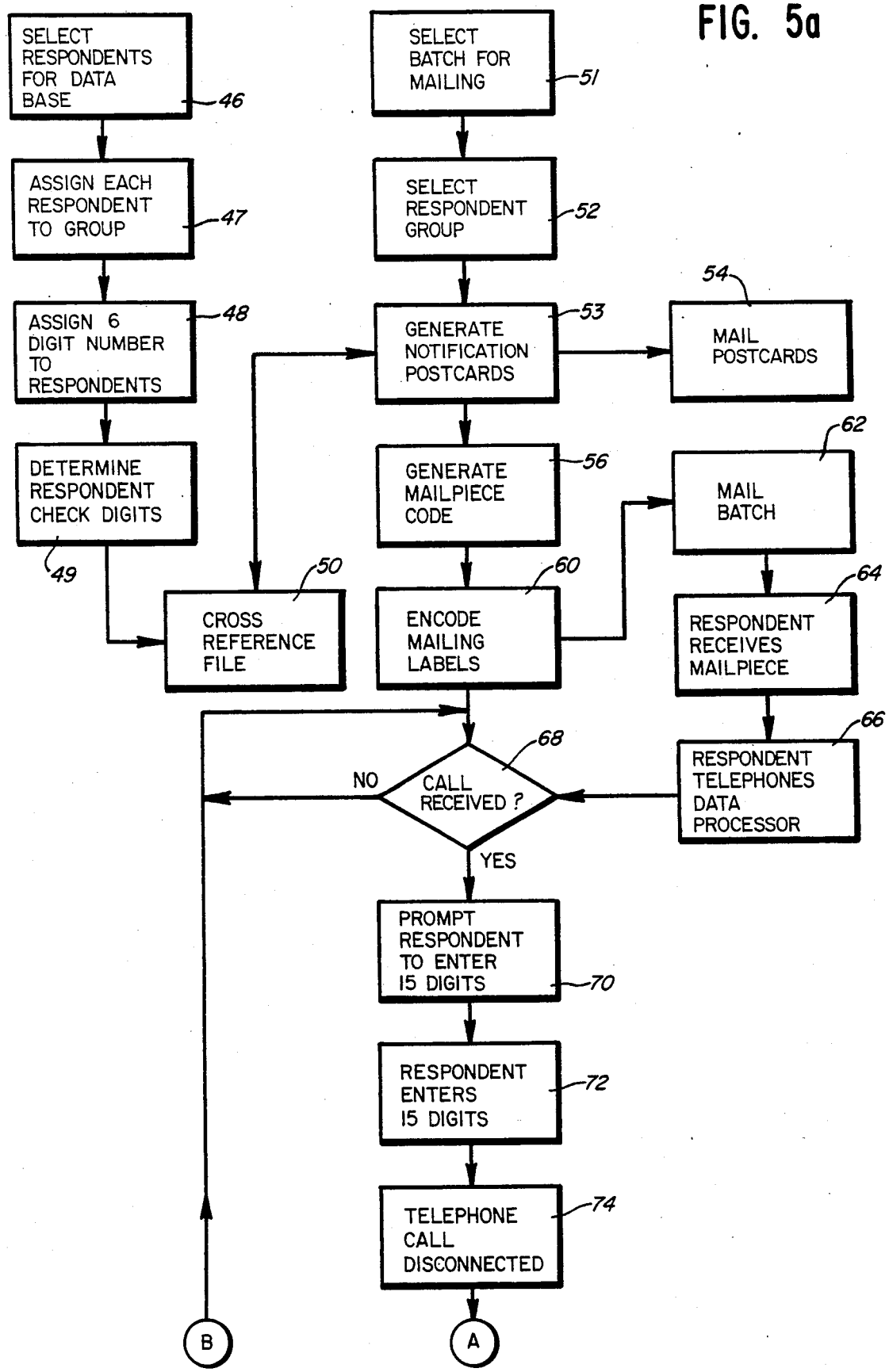
FIGS. 5a and 5b are a flow diagram of the delivery monitoring method.
Figure 5B:
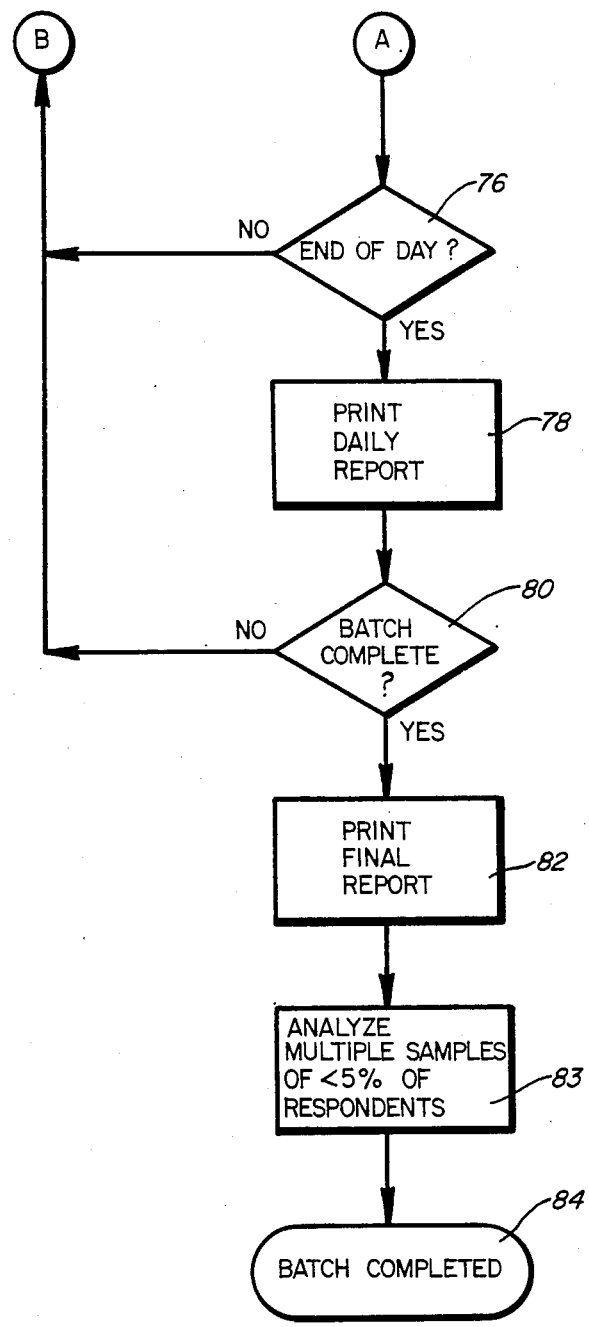

With reference to FIGS. 5a and 5b, a system flow chart illustrates in detail the method of monitoring the delivery status of selected mailing pieces from a batch mailing using the devices previously described with reference to FIGS. 1-4.

At block 46 the respondent database is defined according to the postal service delivery statistic file previously discussed. Each respondent is assigned to a group at block 47; a 6-digit number, the group number and respondent number is assigned at block 48. The check digit is calculated and assigned to the respondent at block 49. The respondent database is stored in a cross reference file at block 50.

At block 51 the originator of the batch mailing, e.g. the catalog printer and mailer, selects the mail pieces to be monitored. A group, or groups, of respondents to receive mailing pieces to be monitored as part of the batch mailing by the data processor is selected at block 52. The groups are selected using the 2 digit group code previously discussed. The cross reference file block 50 stores the names, addresses and identification numbers for the respondents, as previously discussed. The data processor at block 53 selects available respondents from these groups and prepares advance notification cards 18 which are mailed to respondents at block 54 notifying each respondent to anticipate an encoded mailing piece 10. If a respondent will be away from home for any extended period of time, the respondent can be "dialed-out" of the system by reporting in advance to the data processor 20, their seven digit respondent code, a mail piece code of 999, the month and day they will return, and a condition code of 1. Thereafter, those respondents will not be selected at block 53 until the day on which they have indicated as their return date. Subsequent to preparing notification postcards at the block 53, which are mailed at the block 54, control advances to a block 56. The three digit code representing the mailing piece is generated at block 56. Block 60 encodes the mailing labels 12 with the ten digit number 14 uniquely identifying the respondent and the mailing piece 10.

A method for inserting the monitoring mail pieces, into the batch mailing is discussed in greater detail below.

The batch including the encoded mail pieces 10 is mailed to the selected delivery respondents at block 62. The mail pieces 10 are received by respondents at block 64. The respondent places a telephone call to the data processor 20 at block 66. The data processor 20 waits at block 68 for a call to be received. When the call is answered, of the data processor 20, by the first CPU 28 through the voice synthesizer 24a prompts the respondent to enter the encoded multi-digit number 14 and receipt information at block 70. This information is entered at block 72 by touching the push buttons of the phone, and the call is terminated at block 74.

The details of how the information is recorded and verified by the data processor 20 is discussed in greater detail below.

After the call is terminated, decision block 76 determines whether or not it is the end of the day. If it is not the end of the day, the system returns to block 68. Otherwise, at the end of the day a daily report is printed at block 78. Decision block 80 determines if the batch mailing is complete. The batch is complete a predetermined time after mailing or when reports are received from all respondents. If the batch is not complete, the system returns to waiting block 68. If the batch is complete, a final batch report is printed at block 82, the batch is statistically analyzed at block 83, and the monitoring of the batch ends at block 84. The analysis of the batch at block 83 is discussed in greater detail below.

Figure 6A:
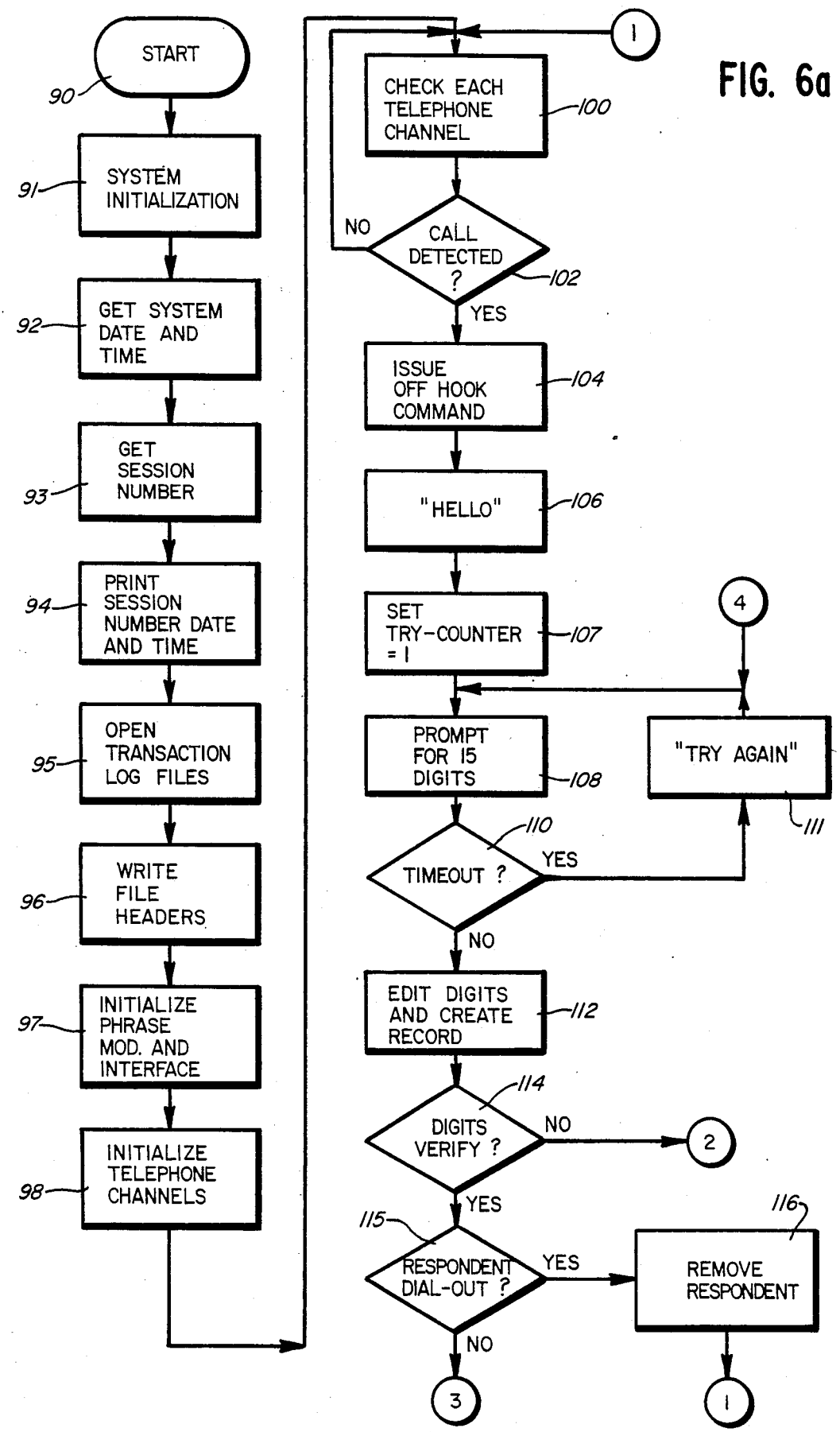
FIGS. 6a–6c are a flow diagram for the data processor.
Figure 6B:
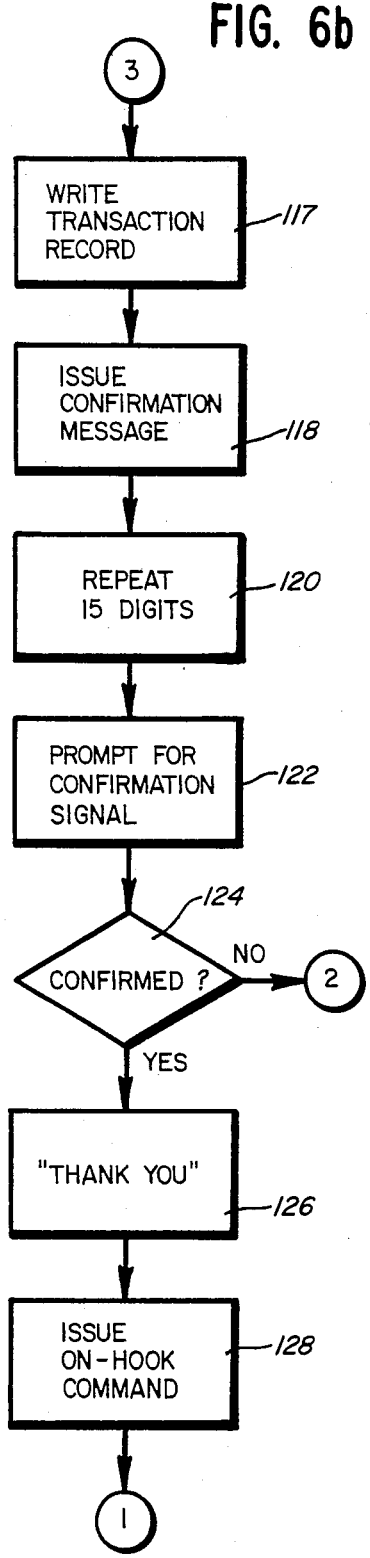
Figure 6C:
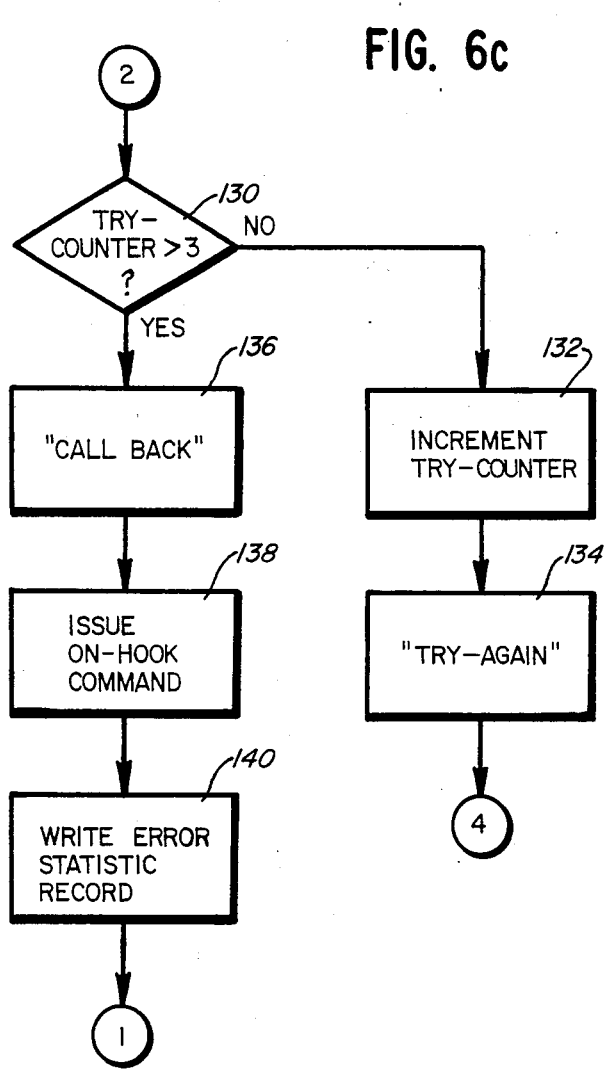

Referring now to FIGS. 6a-6c, a flow diagram of the operation of the data processor 20 is illustrated. The data processor 20 initiates a program for the monitoring method at blocks 90-97. Particularly, the data processor 20 is initialized in a conventional manner at a block 91. At respective blocks 92 and 93, the data processing system 20 gets the day and time and the session number. This information may be entered by an operator using a conventional keyboard, or may be automatically entered if the system is configured to do so. At a block 94 the session number, date and time are printed either on the CRT 30 or the printer 44, see FIG. 4. At a block 95 the transaction log files for the system are open, and file headers are written at a block 96. Subsequently, at a block 97, phrase modules and an interface are initialized to enable communications between the first CPU 28 and the telephone interface 24 for communicating over the telephone lines 26. Block 98 causes the telephone interface 24 to initialize the telephone channels to accept calls from respondents.

Block 100 continually checks each telephone channel for an incoming call. A decision block 102 determines whether or not a call has been received. If no call is received, the system returns to block 100. If a call is detected, block 104 issues on off-hook command to answer the call. A greeting such as "hello" is generated by the voice synthesizer 24a at block 106. A try-counter is set to one at block 107. The try-counter provides an indication of the number of times the respondent has entered receipt information during a call. The use of the try-counter is discussed in greater detail below.

The respondent is prompted at block 108 to enter a fifteen digit number. The fifteen digit number comprises the ten digit number 14 and an additional five digits. Four of the latter five digits represent the month and day when the mailing piece was received. For example, for mailing pieces received on April 9th the four digit number is 0409. The last digit is a condition digit representing the condition of the received mailing piece. The condition digit is 1=good, 2=fair, 3=bad, and 4=no receipt. Decision block 110 determines whether or not fifteen digits have been entered within a predetermined time period. If the fifteen digits are not entered, a "try again" message is given at block 111 and the time period is reset, as by returning to the block 108 to prompt the respondents to enter the fifteen digit number. If the fifteen digits are entered within the set time, a record is created in memory and the digits are edited at block 112.

A decision block 114 verifies that the fifteen digit number is entered correctly. Particularly, the check digit previously discussed is used to verify the seven digit respondent number; the mailing piece code is verified to be valid; the month and day are verified to exist, i.e. 1349 is an invalid code as there is no 49th day in a 13th month; and the condition digit is verified to be 1-4. If the number is verified, decision block 115 determines if the respondent has entered a mail piece code of 999, indicating that the respondent is to be dialed out. If so, the respondent is removed from the list of available respondents at block 116 until the date on which the respondent indicates as a return date. Thereafter, the system returns to block 100 to check for subsequent incoming telephone calls. If the respondent has not dialed out, block 117 writes the receipt information to the transaction record which was created at block 112. The voice synthesizer 24a issues a confirmation message at block 118, repeats each recorded digit at block 120 and prompts the respondent at block 122 to confirm the fifteen digits which were recorded. Decision block 124 determines whether or not a confirmation signal is received. If a confirmation signal is received the voice synthesizer 24a generates a "thank you" message at block 126 and an on-hook command is given at block 128 terminating the call. The system returns to block 100 to check for subsequent incoming telephone calls.

If the digits entered are not verified at decision block 114 or the recorded digits are not confirmed at decision block 124 the system moves to block 130 which determines whether the try-counter is greater than three. If the try-counter is less than three block 132 increments the try-counter by one, and the voice synthesizer 24a prompts the respondent to "try again" at block 134, the system returns to block 108 and the respondent is again prompted to enter the fifteen digits. If the try-counter is greater than three at block 130, indicating three instances of an incorrect number being reported or failure to confirm, the voice synthesizer 24a generates a "call back" message to the respondent at block 136. The system issues an on-hook command at block 138 terminating the call and an error statistic record is written at block 140. The system returns to block 100 to check for subsequent incoming calls.

It is desirable that the batch mailing be presorted so as to take maximum advantage of discounts offered by the postal service as well as to insure desired handling characteristics. To pre-sort the batch, customer address information is stored in order of customer zip code on a magnetic storage tape. One such method of pre-sorting is described in U.S. Pat. Application No. 668,989, filed Nov. 7, 1984, now U.S. Pat. No. 4,674,052, issued Jun. 16, 1987, assigned to the assignee of the present invention, the specification of which is hereby incorporated by reference. As described therein, the postal service provides discounts according to the quantity of pre-sorted pieces being mailed to the same carrier route, 5 digit zip code post office, or a region or city having the same first three digits in their zip codes. When mail pieces which are to be monitored are added to a batch mailing, their insertion into the batch should not affect the discount levels and handling characteristics which would otherwise be available. In fact, the batch should be pre-sorted in the same quantity of postal packages and sacks as there would be if no such monitored mailing pieces were added. This allows the results of the monitoring to accurately reflect the delivery pattern of the batch itself.

Figure 7A:
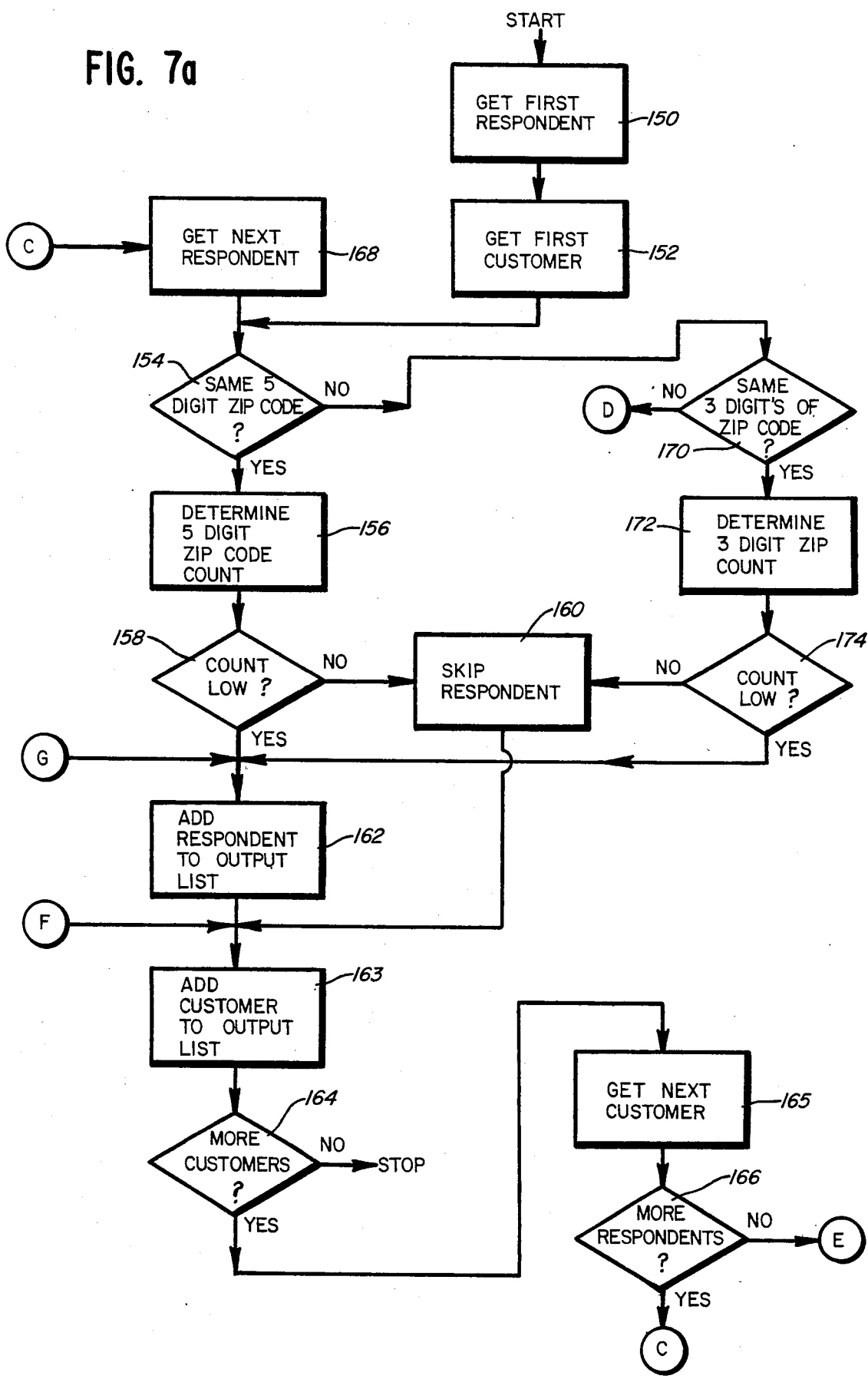

A method of inserting the monitoring mail pieces into the batch mailing is illustrated in the flow diagram of FIGS. 7a-7c. This method is implemented using a programmed data processor (not shown) similar to that in FIG. 4. A list of customers to receive mail pieces in the batch mailing is provided on a medium, such as a magnetic disk memory for access by the data processor. A list of delivery respondents is provided on a second such medium. The data processor, according to this invention, inserts the respondent names onto the list of batch customers so that the discount level is unchanged.

At block 150 the data processor retrieves a record for the first respondent. A record for the first customer is retrieved at block 152. Decision block 154 determines if the retrieved respondent and customer have the same 5 digit zip code. If the zip codes are the same, block 156 determines the number of customers having that zip code. The number of customers for each zip code is stored in a summary record on the storage medium. Decision block 158 determines whether the number of customers having the zip code is low. If the number of customers is not low, indicating that the addition of this respondent will alter the discount level and handling characteristics otherwise provided by the postal service, the respondent is skipped at block 160. Otherwise, the respondent is added to the batch output list at block 162. The output list is the list of all recipients of mail pieces in the batch mailing, including customers and respondents. After the respondent has been skipped at the block 160, or the respondent has been added to the output list at block 162, the customer is added to the output list at block 163.

Decision block 164 determines if there are any more customers. If not, insertion is complete. If more customer records are available, the next customer is retrieved at block 165 and decision block 166 determines whether or not there are more respondents. If additional respondents are available the data processor retrieves the next respondent at block 168. Thereafter, the insertion cycle continues at decision block 154, discussed above.

If decision block 154 determines that a customer and a respondent do not have the same 5 digit zip code, decision block 170 determines whether or not the first three digits of the respondent's and customer's zip codes are identical. If decision block 170 determines that the first three digits of the zip codes are identical, block 172 determines the number of customers having the same first three digits. The determination at block 172 is made in the same way as the determination made at block 156, discussed above. Decision block 174 determines whether the number of customers having the same three digits is low. If the number of customers is not low, indicating that the addition of this respondent will alter the discount level and handling characteristics otherwise provided by the postal service, the respondent is skipped at block 160. Otherwise, the respondent is added to the output list at block 162, and the insertion method continues thereafter.

If decision block 170 determines that the respondent and customer do not have the same first three digits of their respective zip codes, the respondent is placed in a hold table at block 176. Decision block 178 determines if the hold table is full. If the hold table is full, an error message is written at block 180 and the program is aborted at block 182. The hold table will normally only be full when there has been a large number of respondents having an incorrect first three digits of their zip code according to the geographical selective distribution of the batch customers. If decision block 178 determines that the hold table is not full, the program checks the customer file 3 digit count at block 184 to determine the number of customers remaining having the same first three zip code digits. Decision block 186 determines if there are any such remaining customers, and if so, returns to block 168 for the insertion method to continue. If decision block 186 determines if there are no remaining customers having the same first 3 zip code digits, an error message is written at block 188 and the program is aborted at block 190. Because the respondents were initially selected according to geographical distribution of the customers, there should never be a situation where there are more respondents than customers. Therefore, if no customers are remaining, a problem has occurred, such as customer records being removed or truncated from the file. If the program is aborted at either block 182 or block 190, the data processor must be operated to restart the system, as necessary or desired, as by returning to the system start preceding block 150, see FIG. 7a.

If decision block 166, previously discussed, determines that there are no more respondents, while more customers remain in the customer file, the hold table is checked at block 192. Decision block 194 determines if there are any respondents in the hold table with the same first 3 zip code digits as the currently retrieved customer. If no such respondents are in the hold table, the program advances to block 163 and the customer is added to the output list. If decision block 194 determines that there are matching respondents, block 196 determines the number of customers having the same first 3 digits. The determination at block 196 is made in the same way as the determination made at block 156, discussed above. Decision block 198 determines whether the number of customers having the same 3 digits is low. If the number of customers is not low, indicating that the addition of this respondent will alter the discount level and handling characteristics otherwise provided by the postal service, all respondents in the hold table having the same first 3 digits are cleared at block 200, and the customer is added to the output list at block 163. Otherwise, the respondent is retrieved from the hold table at block 202, and the respondents entry in the hold table is cleared at block 204. Thereafter, respondent is added to the output list at block 162, and the insertion method continues thereafter.

Thus, respondents are only added to the customer list if their addition does not alter the postal pre-sort discounts available for the batch or alter the handling characteristics provided thereby. Similarly, if no customer in the batch mailing has the same 3 digit or 5 digit zip code as the respondent the respondent will not be added to the customer list. This results in respondents having a geographically selective distribution corresponding to the batch mailing distribution.

By utilizing a data processor for receiving telephonic communications from respondents this invention permits problems in a mailing of a batch to be identified quickly and accurately with minimal need for personnel. If there is a problem with a particular batch mailing, the postal service can be notified immediately to correct the problem. Also, daily and final batch reports are obtained automatically without need for manual data entry. Furthermore, the use of the unique ten digit code minimizes errors.

The daily report generated by the data processing system can be formatted to indicate date of delivery according to geographical locations of the respondents. Also, the reports can be formatted to indicate the date of receipt according to a pre-sort level for the mailing, receipt or condition according to the pre-sort level. Information such as pre-sort level of a given mailing can readily be input into the system at the initiation of a batch mailing. Such reporting options allow the monitoring method of this invention to readily provide more detailed reports then were available with prior known monitoring methods.

The postal service has a standard for mail delivery time based on the distance which the piece is mailed. Samples of the reported information are analyzed according to their distances and whether they were presorted according to carrier route, 5-digit zip code or 3 digits of the zip code. These samples are compared to the postal service standard to insure that the observed delivery times agree with the expected delivery times. Each sample is non-parametric, i.e., no assumptions are made regarding the distribution of the respondents. To insure accuracy, multiple samples of delivery performance are analyzed using the "bootstrap" method of statistical analysis. The "bootstrap" method is described in an article entitled "ComputerIntensive Methods in Statistics", by Persi Diaconis and Bradley Efron, *Scientific American*, May 1983, Vol. 248, No. 5, which is hereby incorporated by reference. According to the bootstrap method, a large number, such as 1,000, of random samples of no more than 5% of the respondents each are analyzed to determine a bootstrap measure of accuracy. If a statistically reliable difference exists between actual and expected delivery time the postal service can be notified.

I claim:

1. A method of monitoring the delivery status of selected pieces in a batch delivery through a delivery service, comprising the steps of:
   encoding each selected piece with indicia uniquely identifying a respondent therefor;
   forwarding said pieces to said respondent as a part of said batch delivery; and
   operating a data processing system to report receipt of said selected pieces by
   telephonically receiving data of receipt of said selected pieces from said respondents,
   recording said date of receipt,
   and generating a report of the receipt of said selected pieces.

2. The method of claim 1 wherein each of said selected pieces is encoded with indicia comprising said respondent's name and address.

3. The method of claim 1 wherein said respondent telephonically reports to said data processor using a push button operated, multiple frequency coded telephone.

4. The method of claim 1 wherein said data processor includes means for recognizing voice signals and said respondent telephonically reports to said data processor by voice.

5. The method of claim 1 wherein said data processor includes means for converting pulse signals and said respondent telephonically reports to said data processor using a rotary dial telephone.

6. The method of claim 1 wherein said data processor communicates by voice synthesizing means with said respondent.

7. The method of claim 1 wherein said receipt information is recorded on a magnetic disk memory.

8. The method of claim 1 wherein said reported date of receipt comprises a multi-digit number representing said date of receipt of said piece.

9. The method of claim 1 wherein said respondent reports a digit representing a condition of the received piece.

10. The method of claim 1 wherein said selected piece is delivered as part of a batch mailing through the postal service.

11. The method of claim 1 wherein a daily report of received pieces is generated.

12. The method of claim 1 wherein each said selected piece is encoded with indicia uniquely identifying said respondent and said piece.

13. The method of claim 12 wherein said indicia comprises a multi-digit number identifying said respondent and another multi-digit number identifying said piece.

14. The method of claim 1 further comprising the steps of generating advance notification postcards, and delivering said advance notification postcards to said respondent advising each said respondent of the anticipated delivery of an encoded piece.

15. The method of claim 14 wherein said respondent telephonically reports to said data processor if said encoded piece is not received.

16. The method of claim 1 wherein multiple random samples of said dates of receipt are analyzed to determine delivery performance.

17. The method of claim 16 wherein each said random sample comprises less than five percent of all respondents.

18. The method of claim 1 wherein each of said selected pieces is encoded with indicia comprising a number which uniquely identifies said respondent.

19. The method of claim 18 wherein each respondent telephonically reports said number to said data processor.

20. The method of claim 19 wherein said number is a multi-digit number and one of said digits is a check digit and further comprising the step of verifying that said reported multi-digit number is correct.

21. The method of claim 20 wherein said check digit number is determined according to the remaining digits of the multi-digit number.

22. A method of selecting repondents to telephonically report delivery status of pieces in a batch delivery through a delivery service, comprising the steps of:
   determining a desired distribution of said respondents;
   selecting respondents for a respondent data base so that a distribution of said respondents represents said desired distribution;
   assigning each said respondent to a group having an identification number;
   storing information relative to said groups in a memory device; and
   operating a data processor to select respondents to receive pieces in said batch delivery according to said groups by
   accessing said memory device to select respondents according to said groups,
   generating a mail piece code representing the batch mail delivery, and
   encoding mailing labels with indicia uniquely identifying the selected respondent and the mail piece code.

23. The method of claim 22 wherein a respondent telephonically reports to said data processor when said respondent is unavailable to report date of receipt of a piece and said data processor selects only respondents who are available to report receipt of said pieces.

24. The method of claim 22 wherein said data processor selects respondents according to a geographic distribution of said batch delivery.

25. A method of operating a data processor according to a set of programmed instructions to insert a list of respondents for receiving mailing pieces which are to be monitored as part of a batch mailing into an output list of recipients for said batch mailing without altering discount levels or handling characteristics provided by the postal service for the batch mailing, comprising the steps of:

retrieving a respondent record from said respondent list;

retrieving a customer record from a customer list;

comparing respondent destination information from said respondent recording to customer destination information from said customer record;

determining based on said comparing step if inclusion of said respondent affects said discount levels or handling characteristics;

adding said customer to said output list; and adding said respondent to said output list only if inclusion of said respondent does not affect said discount level and said handling characteristics as determined at said determining step.

26. The method of claim 25 wherein said respondent records and said customer records all include zip code information and said data processor adds only those respondents who have a zip code which corresponds to a customer's zip code to said output list.

27. The method of claim 25 wherein said data processor compares zip codes of said respondents to zip codes of said customers.

28. The method of claim 27 further comprising the step of placing said respondent records in a hold table if said respondent zip codes do not match said customer zip codes.

29. The method of claim 28 further comprising the step of comparing said hold table respondent records to said customer records to determine if their respctive zip codes match.

30. The method of claim 29 further comprising the step of adding said respondents from said hold table to said output list only if inclusion of said respondent does not affect said discount level or handling characteristics.

* * * * *